United States Patent [19]
Mata et al.

[11] 3,891,753
[45] June 24, 1975

[54] ANTIBIOTIC PRENOMYCIN AND PROCESS OF PRODUCING THE SAME

[75] Inventors: Justo Martinez Mata, Madrid, Spain; Edward O. Stapley, Metuchen, N.J.

[73] Assignee: Merck & Co., Inc., Rahway, N.J.

[22] Filed: Feb. 7, 1974

[21] Appl. No.: 440,423

[52] U.S. Cl. .............................................. 424/118
[51] Int. Cl. .......................................... A61k 21/00
[58] Field of Search ...................... 424/118; 195/80

[56] References Cited
OTHER PUBLICATIONS
Miller, The Pfizer Handbook of Microbial Metabolites, McGraw-Hill Book Co., Inc., N.Y., N.Y., 1961, pages 140, 141 and 452.

*Primary Examiner*—Jerome D. Goldberg
*Attorney, Agent, or Firm*—Walter Patton; Julian S. Levitt; J. Jerome Behan

[57] ABSTRACT

This invention relates to a new phosphorous-containing antibiotic designated 901A, and is hereafter known as Prenomycin. The antibiotic is produced by culturing the microorganism *Streptomyces ambofaciens*. Prenomycin possesses antibacterial activity against both gram-positive and gram-negative bacteria. This invention relates to a new antibiotic substance, to methods for its use, production by fermentation and also to methods for its concentration, purification and isolation.

4 Claims, 1 Drawing Figure

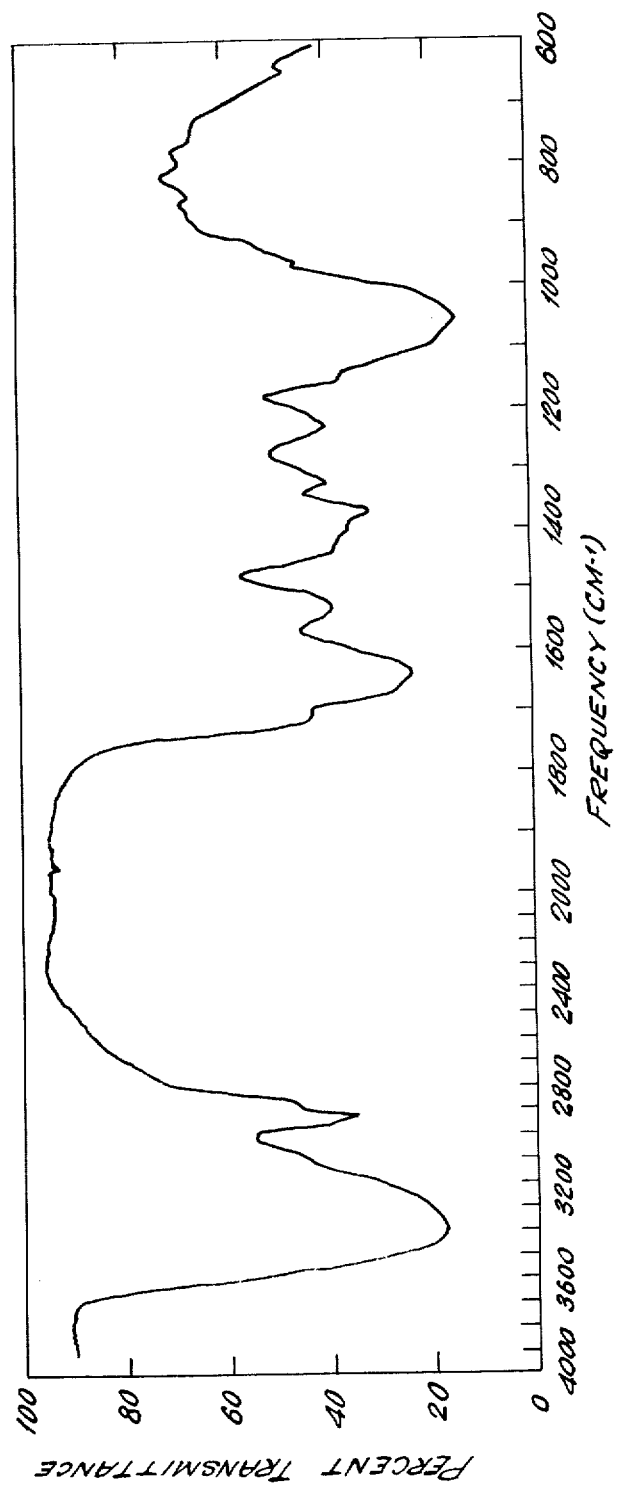

ANTIBIOTIC PRENOMYCIN AND PROCESS OF PRODUCING THE SAME

The search for novel antibiotics is a continuing one because the activity of the known antibiotics is usually effective against only a limited number of pathogenic microorganisms. In addition to this limited spectrum of activity, it has been found that certain strains of some pathogens have been able to develop a resistance to particular antibiotics and, as a result, the antibiotics no longer are as effective against these resistant strains.

The main object of this invention is to provide both a new and useful antibiotic which is effective in inhibiting the growth of pathogenic bacteria in humans and animals and a useful growth promoting agent for animals. Another object of this invention is to provide a process for preparing this antibiotic by the fermentation of a nutrient medium with suitable strains of the microorganisms described below.

This new antibiotic is another phosphorus-containing antibiotic related to the growing family of phosphorous-containing antibiotics which includes among others, the previously described compounds: diumycin, umbrinomycin, moenomycin, prasinomycin, and macarbomycin.

The new antibiotic possesses all of the antimicrobial properties of the known phosphorous-containing antibiotics including activity against gram-positive bacteria such as bacilli, staphylococci, streptococci and diplococci and gram-negative bacteria such as *Escherichia coli*, *Proteus vulgaris* and *Salmonella schottmuelleri*. The new antibiotic Prenomycin has a broad spectrum of activity against gram-negative bacteria and has been found to be active against Pseudomonas.

In addition to its antibiotic activity, Prenomycin is an effective growth promoter in animals when administered orally.

The new antibiotic substance of the present invention is formed by growing, under controlled conditions, a previously unknown strain of the microorganism *Streptomyces ambofaciens*. The *Streptomyces ambofaciens* microorganism was isolated from a sample of soil collected in California, U.S.A. This newly isolated strain of microorganism has been designated as MA-4258 in the culture collection of Merck & Co., Inc., Rahway, N.J. A culture has been deposited without restrictions as to availability with the Fermentation Section of the Northern Utilization Research Branch, U.S. Department of Agriculture at Peoria, Ill. It has been added to the permanent culture collection, and is available to the public under culture No. NRRL 5775.

The morphological and cultural characteristics of *Streptomyces ambofaciens* are set forth in the following table.

Morphology

Sporophores form tight spirals of more than 10 spores, occuring as side chains along the vegetative hyphae. Spores are spherical to oval — $0.9\mu$ diameter and $0.9\mu \times 1.2\mu$.

Cultural

Tomato paste-oatmeal agar — Vegetative growth — Reverse brown; Aerial mycelium — Medium gray (3fe), granular; Soluble pigment — None.

Czapek Dox agar — Vegetative growth — Reverse cream-colored; Aerial mycelium — Medium gray (3fe) edged with darker gray; Soluble pigment — None.

Glycerol asparagine agar — Vegetative growth — Brown; Aerial mycelium — Medium gray mottled with lighter gray and white, granular; Soluble pigment — None.

Egg albumin agar — Vegetative growth — Reverse tan to colorless; Aerial mycelium — Mixture of light gray and white; Soluble pigment — None.

Synthetic starch agar — Vegetative growth — Reverse gray; Aerial mycelium — Medium gray (3fe), powdery; Soluble pigment — None.

Nutrient starch agar — Vegetative growth — Reverse brown; Aerial mycelium — Dark gray (2fe) edged with lighter gray; Soluble pigment — None; Hydrolysis of starch — Good.

Nutrient gelatin agar plates — Vegetative growth — Reverse brown; Aerial mycelium — Medium gray edged with grayish white; Soluble pigment — None; Liquefaction of gelatin — Good.

Gelatin stabs — Vegetative growth — Tan; Aerial mycelium — None; Soluble pigment — Light brown; Liquefaction — Complete.

Potato plug — Vegetative growth — Brown; Aerial mycelium — Cream-colored; Soluble pigment — Slight browning of medium.

Loeffler's Blood Serum Slants — Vegetative growth — Cream-colored; Aerial mycelium — None; Soluble pigment — None; Liquefaction — None.

Temperature range — 50°C. — No growth; 37°C. — Moderate growth; 28°C. — Good growth.

Aerobic

Reduction of nitrate — Positive

Nutrient agar plates — Vegetative growth — Reverse brown; Aerial mycelium — Dark gray; Soluble pigment — None.

Calcium malate plates — Vegetative growth — Reverse colorless to tan; Aerial mycelium — Medium gray, powdery; Soluble pigment — None; Utilizes malate.

Nutrient tyrosine agar — Vegetative growth — Reverse brown to dark brown; Aerial mycelium — Dark gray (2fe) edged with medium gray; Soluble pigment — None; Decomposes tyrosine crystals.

Peptone-iron-yeast extract agar — Vegetative growth — Tan; Aerial mycelium — Medium gray edged with grayish-cream; Soluble pigment — None; Melanin negative; Production of $H_2S$ — Negative.

Yeast extract-dextrose-salts agar — Vegetative growth — Reverse brown; Aerial mycelium — Medium gray (3fe); Soluble pigment — None.

Skim milk agar plates — Vegetative growth — Reverse brown; Aerial mycelium — Grayish white; Soluble pigment — None; Hydrolysis of casein.

Litmus milk — Vegetative growth — Moderate, tan growth ring; Aerial mycelium — Whitish; Soluble pigment — None; Peptonization with solution becoming alkaline.

Skim milk — Vegetative growth — Moderate, tan growth ring; Aerial mycelium — Grayish white, sparse; Soluble pigment — None; Peptonization with solution becoming alkaline.

Carbohydrate utilization (Pridham-Gottlieb basal medium + 1% carbohydrate) — Utilizes glucose, lactose, arabinose, xylose, maltose and fructose for growth. Utilization of raffinose, sucrose, inositol, mannose, rhamnose, mannitol questionable. Cellulose not utilized.

Color designations are from Color Harmony Manual, 4th Edition, 1958, Container Corporation of America, Chicago, Ill.

All Readings were taken after three weeks incubation at 28°C. unless noted. The pH of all media is approximately neutral (6.8 to 7.2).

The above description of the microorganism producing Prenomycin is given as illustrative of a strain of *Streptomyces ambofaciens* (*MA*-4258) which can be employed in the production of Prenomycin. However the present invention also embraces mutant species of the above-described microorganisms. For example, those mutants which are obtained by natural selection or those produced by mutating agents including X-ray irradiation, ultraviolet irradiation or nitrogen mustards or like treatments.

IN VITRO ACTIVITY

A sample of Prenomycin, purified by the method described in Example 3, was assayed in a series of agar diffusion assays. A broad spectrum of activity was obtained and is summarized in Table 1.

Methods

The assay was performed by placing 0.02 ml. droplets of aqueous solutions of antibiotics having the concentrations 125 µg/ml. 250 µg/ml., 500 µg/ml., and 1000 µg/ml. of antibiotic on the surface of 100 mm. petri plates containing 5 ml. of inoculated nutrient agar with 0.2% yeast extract.

IN VIVO ACTIVITY

Method

White Swiss mice were infected intraperitoneally and treated by the route indicated in Table 2 at the time of infection and again 6 hours later. Five mice were used at each of the four-fold antibiotic concentrations tested. The amount of antibiotic that should protect 50 percent of the infected treated animals ($ED_{50}$) is calculated from the survival records obtained on the seventh day after infection by the method of Knudson & Curtis (J. Amer. Statist. Assoc, 42:282–296, 1947). Controls of the virulence of the test culture were included in each test.

TABLE 2

| Infecting Organism | Route of Therapy | $ED_{50}$ in µg/mouse ×2 Doses |
|---|---|---|
| Staphylococcus aureus 2949 | ip | 3,980. |
| Streptococcus pyogenes 3009 | ip | 1.6 |
|  | sc | 7.8 |
|  | po | 24,000. | ip = intraperitoneal
sc = subcutaneous
po = oral

Prenomycin protected mice against infection with *Staphylococcus aureus* 2949 and *Streptococcus pyogenes* 3009. It was effective both when given by the intraperitoneal and by the subcutaneous route (sc/ip ratio of 4 in two tests), but was essentially inactive when given by the oral route (po/ip ratio of 15,000 in one test).

Furthermore, Prenomycin shows prolongation of antistreptococcal activity in vivo. Mice given a single subcutaneous treatment with this agent were protected against a lethal infection of *Streptococcus pyogenes* 3009 given 2 days, 4 days, or 7 days later. The amount of antibiotic required to protect 50% of the infected animals ($ED_{50}$) increased as the interval between treatment and infection increased.

Groups of these mice were given a single subcutaneous injection of Prenomycin 7 days before infection. Other mice were treated 4 days before, 2 days before or on the day of infection. *Streptococcus pyogenes* 3009 was used as the infecting organism. The $ED_{50}$ values obtained are shown in Table 3.

TABLE 1

In Vitro Activity of Prenomycin in Agar Diffusion Assays

| Organism | Culture Source | Zones of Inhibition, mm | | | |
|---|---|---|---|---|---|
|  |  | 1000 µg/ml. | 500 µg/ml. | 250 µg/ml. | 125 µg/ml. |
| Bacillus sp. | MB** 633 | 30 | 27 | 27 | 25 |
| Proteus vulgaris | MB 1012 | 26 | 25 | 20 | 19 |
| Pseudomonas aeruginosa | MB 979 | 17 | 15 | 11 | 7 |
| Serratia marcescens | MB 252 | 15 | 14 | 13 | 12 |
| Staphylococcus aureus | ATCC 6538P | 36 | 35 | 32 | 30 |
| Bacillus subtilis | ATCC 6633 | 37 | 35 | 34 | 30 |
| Sarcina lutea | MB 1101 | 21 | 20 | 19 | 19 |
| Staphylococcus aureus | MB 698* | 20 | 19 | 19 | 19 |
| Pseudomonas stutzeri | MB 1231 | 18 | 15 | 10 | 4 |
| Streptococcus faecalis | MB 753* | 21 | 20 | 20 | 20 |
| Alcaligenes faecalis | ATCC 213* | 23 | 20 | 19 | 16 |
| Brucella bronchiseptica | MB 965* | 25 | 21 | 19 | 15 |
| Salmonella gallinarum | MB 1287 | 16 | 14 | 10 | 10 |
| Vibrio percolans | ATCC 8461 | 26 | 24 | 20 | 18 |
| Xanthomonas vesicatoria | MB 815 | 21 | 17 | 14 | 13 |
| Klebsiella pneumoniae | MB 1264 | 20 | 17 | 15 | 14 |
| Aerobacter aerogenes | MB 835 | 15 | 10 | 8 | 8 |
| Erwinia atroseptica | MB 1159 | 18 | 16 | 12 | 10 |
| Corynebacterium pseudodiphtheriticum | MB 261 | 21 | 17 | 15 | 12 |
| Escherichia coli | MB 60 | 14 | 12 | 12 | 12 |
| Staphylococcus aureus | MB 3032 | 30 | 29 | 27 | 25 |

*Plates incubated overnight at 37°C, remainder at 25°C.
**MB = culture collection of Merck & Co., Inc., Rahway, N.J.

TABLE 3

Ability of Prenomycin to Protect
Mice Against Delayed Infection

| Time of Therapy* in Days Before Infection | $ED_{50}$ in µg/mouse by S.C. Administration | Ratio of $ED_{50}$ Values of indicated day over day 0 |
|---|---|---|
| 7 | 250 | 8 |
| 4 | 235 | 8 |
| 2 | 63 | 2 |
| 0 | 31 | 1 |

*Mice given a single subcutaneous treatment of antibiotic on the day indicated. All animals infected intraperitoneally on day 0 with 580 $LD_{50}$'s of Streptococcus pyogenes 3009 in broth.

It can be seen that mice can be protected against the Streptococcus when the antibiotics were given as long as 7 days before infection (the largest spread between treatment and infection used in this experiment). The amount of antibiotic required for an $ED_{50}$ increased as the time between treatment and infection increased, as reflected by the ratios listed in Table 3. For purposes of comparison the $ED_{50}$ of penicillin against S. pyogenes 3009 increased 40 times when treatment preceded infection by 1 hour in tests of this antibiotic.

Prenomycin is useful both as an antibiotic in humans and animals and as a growth promoting agent in animals.

When Prenomycin is used as an antibiotic, the specific means employed for administrating it to humans and animals is critical and depends upon the result desired. Since Prenomycin is not orally obsorbed, it must be administered by the parenteral route to obtain a desired systemic effect.

Prenomycin can be used as an antibiotic, for example, in the form of pharmaceutical preparations which contain it in admixture or conjunction with an organic or inorganic, solid or liquid pharmaceutical excipient suitable for enteral, parenteral or local administration. Suitable excipients are substances that do not react with the antibiotic, for example, water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or contain assistants, such as preserving, stabilizing, wetting or emulsifying agents; solution promoters, salts for regulating the osmotic pressure or buffers.

Where it is desired to administer the antibiotic in dry, solid unit dosage form, capsules, boluses or tablets containing the desired amount of antibiotic are employed. These dosage forms are prepared by intimately and uniformly mixing the active ingredient with suitable finely divided diluents, fillers, disintegrating agents and/or binders such as starch, lactose, talc, magnesium stearate, vegetable gums and the like.

Such unit dosage formulations may be varied widely with respect to their total weight and content of Prenomycin depending upon factors such as the type of host animal or human to be treated, the severity and type of infection and the weight of the host. The antibiotic may be administered on a daily basis at from about 20 to 200 mg. per kilogram of body weight.

Included in this invention are the non-toxic, pharmaceutically acceptable salts of Prenomycin, for example, the alkali and alkaline earth metal salts such as those derived from sodium, potassium, ammonium and calcium or salts with organic bases, for example triethylamine, N-ethylpiperidine, dibenzylethylenediamine.

In addition to its use as an antibiotic, Prenomycin is useful as a feed additive to promote the growth of animals such as chickens, sheep and cattle. The use of Prenomycin shortens the time required for bringing animals up to marketable weight.

When Prenomycin is used as a growth promoter in animals, it can be administered as a component of the feed of the animals or may be dissolved or suspended in the drinking water.

When Prenomycin is used as a component of the animal feed, it is first formulated as a feed supplement. In such feed supplements, Prenomycin is present in relatively large amounts intimately dispersed in an inert carrier or diluent. The feed supplement can be added directly to the feed or made into a premix by an intermediate dilution or blending step. By inert carrier is meant one that will not react with the antibiotic and one that may be administered safely to animals. Preferably, the carrier is one that is, or may be, an ingredient of the animal ration. Typical carriers or diluents suitable for such compositions include, for example, distiller's dried grains, corn meal, citrus meal, fermentation residues, ground oyster shells, wheat shorts, molasses solubles, corn cob meal, edible bean, mill feed, soya grits, crushed limestone and the like. The antibiotic is intimately dispersed throughout the carrier by methods such as grinding, stirring, milling or tumbling. Compositions containing from about 5 to 50% by weight of the antibiotic are particularly suitable as feed supplements.

Examples of typical feed supplements containing Prenomycin is dispersed in a solid carrier are:

|     |                        | lbs. |
|-----|------------------------|------|
| (A) | Prenomycin             | 5    |
|     | Wheat Standard Middling| 95   |
| (B) | Prenomycin             | 50   |
|     | Corn distiller's grains| 50   |

These and similar feed supplements are prepared by uniformly mixing the antibiotic with the carrier.

Such supplements are added to the animal feed in an amount to give the finished feed the concentration of Prenomycin desired for growth promotion. In chickens, Prenomycin is fed at a final concentration of between 50 gm. to 200 gm. per ton of feed in order to achieve the desired growth promoting result.

In the above discussion of this invention, emphasis has been placed on solid compositions wherein the Prenomycin is mixed with an edible carrier in a feed supplement, in a so-called premix or in the final poultry feedstuff. This is the preferred method of administering Prenomycin. The antibiotic or its salts can also be administered to the animals in the drinking water, at a level of 0.001 to 0.1%. Although this method is generally not preferred since it is more difficult to administer the optimum amount of the antibiotic in this manner. The antibiotic can be dissolved or suspended in the drinking water. The quantity that may be suspended in the water without undue settling is limited. Emulsifiers or surface active agents may be employed for this latter purpose.

It will likewise be understood by those skilled in this art that special feed supplement formulations and finished animal feeds containing Prenomycin may also include vitamins, other antibiotics and growth-promoting agents and other nutritional substances.

Prenomycin is produced during the aerobic fermentation of suitable aqueous media, under conditions described hereinafter, by strains of *Streptomyces ambofaciens*. Aqueous media such as those used for the produciton of other antibiotics are suitable for the production of Prenomycin.

Such media contain sources of carbon and nitrogen assimilable by the microorganisms and inorganic salts. In addition, the fermentation media contain traces of metals necessary for the growth of the microorganisms which are usually present in complex sources of carbon and nitrogen of the medium.

In general, carbohydrates such as sugars, for example, dextrose, sucrose, maltose, lactose, dextran and the like, and starches, are suitable sources of assimilable carbon in the nutrient media. The exact quantity of the carbon source which is utilized in the medium will depend, in part, upon the other ingredients of the medium but it is usually found that the amount of carbohydrate between about 1 and 6 percent by weight of the medium is satisfactory. These carbon sources can be used individually or several such carbon sources may be combined in the medium.

Various nitrogen sources such as yeast hydrolysates, yeast autolysates, yeast extract, soybean meal, corn meal, casein hydrolysates, corn steep liquors, distiller's solubles, meat extract, peptone and the like, are readily assimilable by the new strains of *Streptomyces ambofaciens* in the production of Prenomycin. The various sources of nitrogen can be used alone or in combination in amounts ranging from about 0.2 to about 6 percent by weight of the medium.

The following are examples of media suitable for growing the several strains of *Streptomyces ambofaciens* for producing Prenomycin.

| Medium A | | |
|---|---|---|
| Dextrose | 10.0 | g. |
| Peptone | 5.0 | g. |
| Yeast Extract | 3.0 | g. |
| NaCl | 12.705 | g. |
| KCl | 0.72 | g. |
| FeSO$_4$(NH$_4$)$_2$SO$_4$.6H$_2$O | 0.0351 | g. |
| MgCl$_2$.6H$_2$O | 5.32 | g. |
| CaCl$_2$.2H$_2$O | 0.728 | g. |
| Distilled H$_2$O | 1000 | ml. |
| pH 7.4 before sterilization | | |
| Medium B | | |
| Corn Meal | 20 | g. |
| Distiller's Solubles | 10 | g. |
| Soybean Meal | 15 | g. |
| Na Citrate | 4 | g. |
| CaCl$_2$.2H$_2$O | 0.5 | g. |
| MgSO$_4$.7H$_2$O | 0.1 | g. |
| CoCl$_2$.6H$_2$O | 0.01 | g. |
| FeSO$_4$.7H$_2$O | 0.01 | g. |
| Polyglycol | 0.25% | by Vol. |
| Distilled H$_2$O | 1000 | ml. |
| pH 6.5 | | |
| Medium C | | |
| Lactose | 40.0 | g. |
| Corn Steep | 64.0 | g. |
| KH$_2$PO$_4$ | 4.0 | g. |
| MgSO$_4$.7H$_2$O | 1.0 | g. |
| CaCO$_3$ | 10.0 | g. |
| Distilled H$_2$O | 1000 | ml. |
| pH - adjust to 6.5 before | | |
| CaCO$_3$ addition. Add 0.25% mineral oil to each flask. | | |

The fermentation employing the Prenomycin producing microorganism can be conducted at temperatures ranging from about 20° to about 37°C. For optimum results, we find it most convenient to conduct these fermentations at a temperature in the range of from about 24° to about 32°C. The pH of the nutrient medium suitable for producing Prenomycin can vary from about 5.0 to 9.0 with a preferred range of 6.0 to 7.5.

Small scale fermentations are conveniently carried out by placing suitable quantities of nutrient medium in a flask employing known sterile techniques, inoculating the flask with either spores or vegetative cellular growth of a Prenomycin producing strain of *Streptomyces ambofaciens* loosely stoppering the necks of the flasks with cotton and permitting the fermentation to proceed in a constant temperature room at about 28°C. on a shaker for about 3 to 10 days. For larger scale work, it is preferable to conduct the fermentation in suitable tanks provided with an agitator and a means of aerating the fermentation medium. The nutrient medium is made up in the tank and after sterilization is inoculated with a suitable source of vegetative cellular growth of a Prenomycin producing strain of *Streptomyces ambofaciens*. The fermentation is allowed to continue for from 1 to 5 days while agitating and/or aerating the nutrient medium at a temperature in the range of from about 24° to 32°C.

The examples which follow are illustrative of the fermentation processes useful in the production of Prenomycin.

EXAMPLE 1

Shake Flask Production of Prenomycin

A culture of *Streptomyces ambofaciens* strain MA-4258a is produced gy growing the organism on a sterile agar slant of the following composition:

| Medium A | | |
|---|---|---|
| Dextrose | 10.0 | g. |
| Peptone | 5.0 | g. |
| Yeast Extract | 3.0 | g. |
| NaCl | 12.705 | g. |
| KCl | 0.72 | g. |
| FeSO$_4$(NH$_4$)$_2$SO$_4$.6H$_2$O | 0.0351 | g. |
| MgCl$_2$.6H$_2$O | 5.32 | g. |
| CaCl$_2$.2H$_2$O | 0.728 | g. |
| agar | 25.0 | g. |
| Distilled H$_2$O | 1000 | ml. |
| pH 7.4 before sterilization | | |

An L-tube of *Streptomyces ambofaciens* MA-4258a is opened aseptically by standard techniques and the contents used to inoculate slants of Medium A which are incubated for 1 week at 28°C. They are then stored at 4°C. until used. The culture on one of these slants is transferred aseptically to three 250 ml. baffled Erlenmeyer flasks containing 50 ml. of medium of the following composition:

| Medium B | | |
|---|---|---|
| Corn Meal | 20 | g. |
| Distiller's Solubles | 10 | g. |

-Continued

| | | |
|---|---|---|
| Soybean Meal | 15 | g. |
| Na Citrate | 4 | g. |
| CaCl$_2$.2H$_2$O | 0.5 | g. |
| MgSO$_4$.7H$_2$O | 0.1 | g. |
| CoCl$_2$.6H$_2$O | 0.01 | g. |
| FeSO$_4$.7H$_2$O | 0.01 | g. |
| Polyglycol | 0.25% | by Vol. |
| Distilled H$_2$O | 1000 | ml. |
| pH 6.5 | | | which is incubated on a 220 rpm. shaker (2 inch throw) at 28°C. for 2 days.

The contents of this seed flask is used to inoculate (at 4%) 2-liter Erlenmeyer production flasks containing 200 ml. of medium having the following composition:

| Medium C | | |
|---|---|---|
| Lactose | 40.0 | g. |
| Corn Steep | 64.0 | g. |
| KH$_2$PO$_4$ | 4.0 | g. |
| MgSO$_4$.7H$_2$O | 1.0 | g. |
| CaCO$_3$ | 10.0 | g. |
| Distilled H$_2$O | 1000 | ml. |
| pH adjust to 6.5 before CaCO$_3$ addition. Add 0.25% mineral oil to each flask. | | |

The production flasks are incubated at 28°C. on a 220 rpm. shaker (2 inch throw) for 4 days at which time the flasks are pooled, centrifuged and assayed. The assay of the pooled, centrifuged broth supernatent shows a 23 mm. inhibition zone (one-half inch disc) against *Staphylococcus aureus* ATCC 6538P on a standard plate assay.

All the flasks in the above procedure are sterilized prior to use by autoclaving at 120°C.; 250 ml. flasks for 20 minutes, and 2-liter Erlenmeyer flasks for 25 minutes.

EXAMPLE 2

Fermentation Process for Large Scale Production of Prenomycin

Stage 1

The contents of one lyophilized tube of *Streptomyces ambofaciens* strain MA-4258a is used to inoculate slants of Medium A using aseptic techniques. These slants are incubated at 28°C. for 5 days or until well sporulated. These slants are then stored at 5°C. until used but for not more than 2 weeks.

Stage 2

Ten ml. of Medium B is added to a slant from Stage 1, the growth is scraped into a suspension and used to inoculate seed flasks containing 500 ml. of Medium B per 2 liter baffled Erlenmeyer flask using aseptic techniques. The flasks are shaken at 28°C. on a rotary shaker for 72 hours or until good vegetative growth is obtained.

| Medium B | | |
|---|---|---|
| Corn Meal | 20.0 | g. |
| Distiller's Solubles | 10.0 | g. |
| Soybean Meal | 15.0 | g. |
| Na Citrate | 4.0 | g. |
| CaCl$_2$.2H$_2$O | 0.5 | g. |
| MgSO$_4$.7H$_2$O | 0.1 | g. |
| CoCl$_2$.6H$_2$O | 0.01 | g. |
| FeSO$_4$.7H$_2$O | 0.01 | g. |
| Polyglycol No. 2000 | 0.25% | by Vol. |
| Distilled H$_2$O | to 1000 | ml. |
| (pH 6.5) | | |

Stage 3

The contents of a Stage 2 seed flask (500 ml.) is used to inoculate 160 liters of Medium B in a 50 gallon stainless steel fermentor. Incubation in the fermentor is allowed to proceed for 72 hours at a temperature of 28°C., with agitation at 150 rpm. and airflow at 3 cu. ft. per minute. During incubation, defoamer (Polyglycol No. 2000) is used as required to control foam. During the fermentation, pH determinations were made as follows:

| Age (Hours) | 0 | 24 | 48 | 72 |
|---|---|---|---|---|
| pH | 6.3 | 7.0 | 7.7 | 8.1 |

Stage 4

A portion of the contents of the Stage 3 fermentor (43 liters or 8.3% of the Stage 4 fermentor volume) is used to inoculate 467 liters of Medium C in a 200 gallon stainless steel fermentor. Fermentation is allowed to proceed for 72 hours at a temperature of 28°C. with agitation at 130 rpm. and an airflow of 10 cu. ft. per minute. During fermentation, defoamer (Polyglycol No. 2000) is used as required to control foam.

Determinations are made periodically of pH and antibiotic activity as follows:

| Age (Hours) | 0 | 12 | 24 | 36 | 48 | 60 | 72 |
|---|---|---|---|---|---|---|---|
| pH | 6.6 | 6.9 | 7.5 | 7.8 | 7.9 | 7.9 | 7.8 |
| Assay: Staphylococcus aureus ATCC 6538P Plate (¼" disc) | — | — | — | — | 24 | 25 | 26 mm. |

| Medium A | | |
|---|---|---|
| Dextrose | 10.0 | g. |
| Peptone | 5.0 | g. |
| Yeast Extract | 3.0 | g. |
| NaCl | 12.705 | g. |
| KCl | 0.72 | g. |
| FeSO$_4$(NH$_4$)$_2$SO$_4$.6H$_2$O | 0.0351 | g. |
| MgCl$_2$.6H$_2$O | 5.32 | g. |
| CaCl$_2$.2H$_2$O | 0.728 | g. |
| Agar | 25.0 | g. |
| Distilled H$_2$O | 1000 | ml. |
| pH 7.4 before sterilization | | |

| Medium C | | |
|---|---|---|
| Lactose | 40.0 | g. |
| Corn Steep | 64.0 | g. |
| KH$_2$PO$_4$ | 4.0 | g. |
| MgSO$_4$.7H$_2$O | 1.0 | g. |
| CaCO$_3$ | 10.0 | g. |
| Distilled H$_2$O | to 1000 | ml. |
| pH - adjust to 6.5 before CaCO$_3$ addition. | | |

The Prenomycin is isolated and purified as described in Example 3.

EXAMPLE 3

Isolation and Purification of Prenomycin

Four hundred liters of whole broth obtained from Example 2 Stage 4 is passed through a Sharples centrifuge to collect cell paste. The centrifuge paste is slurried in 200 liters of methanol and stirred for one-half hour. The slurry is then filtered. The filtrate is concentrated by the evaporation under vacuum of the methanol and the periodic addition of water until a 100 liter aqueous solution is obtained.

The pH of the aqueous solution is adjusted to 7.5 ± 0.2 and adsorbed on 20 liters of Dowex 1 × 2 Cl⁻ cycle resin. The adsorbate is then washed with 40 liters of de-ionized water.

After washing, the adsorbate is eluted with 90% methanol:10% water:3% ammonium chloride v.v.w. Eight 8-liter fractions are collected and assayed against *Proteus vulgaris* ATCC 21100, using the disc plate method. Eluate fractions 2 through 4 contain 92% of the bioactivity applied.

Eluate fraction 2 and 3 are combined and concentrated by evaporation under vacuum until a 20 liter aqueous solution is obtained. The aqueous solution is adjusted to pH 7.2 ± 0.2 and absorbed on 8 liters of Rohm and Haas Amberlite XAD-2. The adsorbate is washed with 40 liters of de-ionized water followed by 40 liters of 25% aqueous methanol and then eluted with 60% aqueous acetone collecting eight 4-liter fractions. Fractions 2 through 5 are combined and concentrated as above to 5 liters, after the addition of 1 liter of n-butanol to reduce foaming. The concentrate contains approximately 25% of the total activity of the original paste extract. The concentrate contains 11.2 grams of solids.

A 1 liter aliquot of the aqueous concentrate at pH 7.0 is extracted with 1 liter of n-butyl alcohol. The aqueous phase is concentrated by evaporation under vacuum to remove the butanol and the resulting aqueous solution freeze-dried to yield 1.4 g. of solids which contains 80% of the bioactivity present in the 1 liter aliquot.

The above freeze-dried solid is taken up in 30 ml. of water containing 1% n-butanol and 15 ml. applied to a 5 × 102 cm. column of Sephadex G-25 and developed with water containing 1% n-butanol at 10 ml./min. collecting 20 ml. fractions. A Mecco-Matic recording refractometer is used to monitor the effluent stream. The fractions are assayed, using the disc plate method, against *Staphylococcus aureus* MB-108. the bioactivity is found in tubes 45–75. The above procedure is repeated with the remaining 15 ml. and the bioactivity found in tubes 45 to 80.

Fractions 49 to 67 from the first chromatography are combined with fractions 52 to 69 of the second chromatography and concentrated to dryness. The residue is 400 mg. These solids are rechromatographed as above. The bioactivity is found in tubes 46 to 79.

Fractions 56 to 75 are combined, concentrated to 10 ml. at pH 7.0 and freeze-dried to yield 150 mg. of bioactive sodium salt of Prenomycin. The biopotency of the sodium salt of Prenomycin is determined by the agar diffusion method using one-half inch discs. A 25 mm. zone of inhibition is obtained against *Staphylococcus aureus* MB-108 at a concentration of 8 μg./ml.

Preparation of the free acid

Thirty mgs. of the above sodium salt is dissolved in 5 ml. of water and applied to a 3 ml. column of Dowex 50 × 2 H⁺ cycle resin and the resin washed with 10 ml. of water. The effluent and wash are combined and freezedried to yield 25 mg. of the free acid of Prenomycin.

The sodium salt and the free acid of Prenomycin obtained above are used to obtain the results reported under the headings Physical Characteristics and In Vitro Activity.

The following is a diagram of the purification method described in Example 3.

FLOW SHEET – PRENOMYCIN PURIFICATION PROCESS

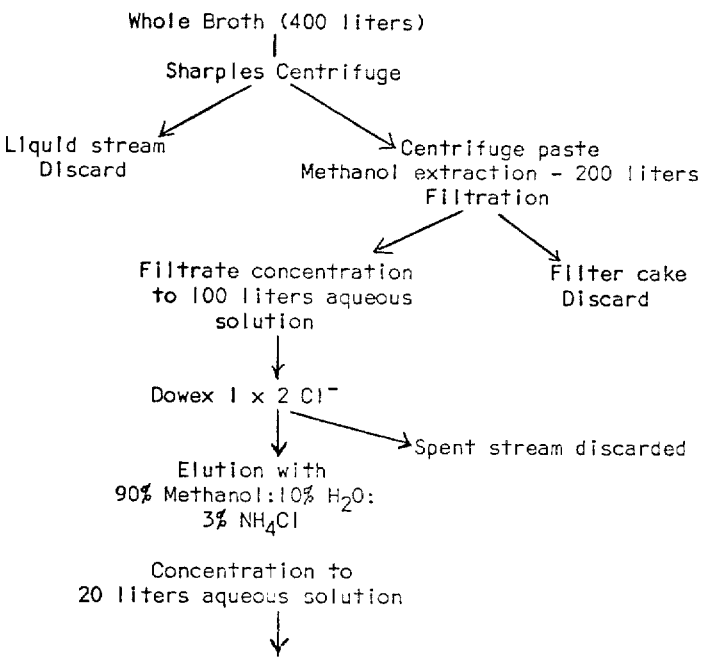

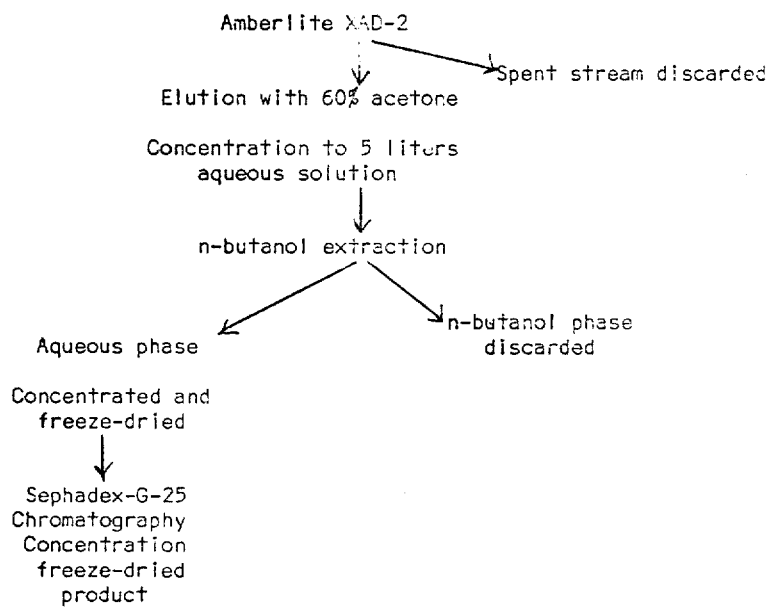

PHYSICAL CHARACTERISTICS

The material used for determining physical characteristics was obtained by the procedure described in Example 3 above.

A solution of the sodium salt of Prenomycin in 0.1 N hydrochloric acid exhibits an ultraviolet absorption with a peak at λmax. 246 nm $E_{1cm.}^{1\%}$ 55.9.

A solution of the sodium salt of Prenomycin in 0.1 N sodium hydroxide exhibits an ultraviolet absorption with a peak at λmax. 258 nm $E_{1cm.}^{1\%}$ 101.

The infrared absorption spectrum of the sodium salt of Prenomycin in KBr is reproduced in FIG. 1 in the drawing. Prenomycin exhibits characteristic absorption in the infrared region of the spectrum at the following wave lengths expressed in reciprocal centimeters (cm.$^{-1}$):

Broad bands at; 1630 to 1660; 1510 to 1540; 1020 to 1080 Strong bands at: 1710; 1370; 1320; 1220 to 1230.

Prenomycin contains the elements carbon, hydrogen, nitrogen, phosphorous and oxygen. The following is an elemental analysis of Prenomycin:

| | |
|---|---|
| Carbon | 48.5% |
| Hydrogen | 7.0% |
| Nitrogen | 4.9% |
| Phosphorous | 1.7% |
| Oxygen (by difference) | 37.9% |

According to the micro-analytical data, Prenomycin has the approximate empirical formula: $C_{72}H_{125}N_6O_{42}P$ with a calculated molecular weight of 1778. Titration of the free acid of Prenomycin indicated a pH one-half value of 4.6 and an equivalent weight of 613, wherein pH one-half is defined as the pH half way to the end point of the titration.

What is claimed is:

1. An antibiotic, Prenomycin, or its pharmacologically acceptable salts thereof effective as a growth promoting agent and in inhibiting the growth of gram-positive and gram-negative microorganisms which sodium salt has an ultraviolet adsorption peak at 246 mμ in a 0.1N hydrochloric acid solution and an ultraviolet adsorption peak at 258 mμ in a 0.1N sodium hydroxide solution having an infrared spectrum in potassium bromide as shown in FIG. 1, and an elemental analysis of its free acid as follows: C = 48.5 percent; H = 7.00 percent; N = 4.9 percent; phosphorus = 1.7 percent; and O = 37.9 percent (by difference) with the said free acid having an approximate empirical for formula of: $C_{72}H_{125}N_6O_{42}P$ with a molecular weight of 1778, a measured equivalent weight of 613 and a pH one-half of 4.6.

2. The process for preparing an antibiotic of claim 1 which comprises cultivating a Prenomycin producing strain of Streptomyces ambofaciens NRRL 5775 in an aqueous nutrient medium containing 1 to 6% by weight carbohydrate, and 0.2 to 6% by weight of a nitrogen source, under aerobic conditions, at a temperature in the range of from 20° to 37°C., and a pH in the range of 5 to 9 and for a period of about 1 to 10 days until antibiotic activity is imparted to said medium.

3. The process according to claim 2 wherein the fermentation is conducted at a temperature in the range of from 24° to 32°C. for a period of about 3 to 10 days.

4. The process of claim 2 wherein the antibiotic is isolated.

* * * * *